United States Patent [19]

Kaiser et al.

[11] 4,042,547
[45] Aug. 16, 1977

[54] ENVIRONMENTALLY HARMLESS STOVING LACQUER SYSTEMS BASED ON ALKYD RESINS CONTAINING CONDENSED MONOHYDRIC ALCOHOLS

[75] Inventors: Bernd-Ulrich Kaiser; Rolf Dhein; Hans Rudolph; Rolf Kuchenmeister, all of Krefeld, Germany

[73] Assignee: Bayer Aktiengesellschaft, Germany

[21] Appl. No.: 714,784

[22] Filed: Aug. 16, 1976

Related U.S. Application Data

[63] Continuation-in-part of Ser. No. 659,251, Feb. 19, 1976, abandoned, which is a continuation of Ser. No. 460,991, April 15, 1977, abandoned.

[30] Foreign Application Priority Data

| Apr. 18, 1973 | Germany | 2319635 |
| Sept. 13, 1973 | Germany | 2346130 |
| Feb. 19, 1974 | Germany | 2407791 |

[51] Int. Cl.² .......................... C09D 3/64; C09D 3/66
[52] U.S. Cl. .......................... 260/22 R; 260/22 CQ; 260/22 A; 260/31.2 XA; 260/32.8 R; 260/33.6 R; 260/33.4 R; 260/77
[58] Field of Search .................... 260/22 A, 22 M, 77, 260/22 R

[56] References Cited

U.S. PATENT DOCUMENTS

| 2,527,374 | 10/1950 | Patrick et al. ........................ 260/77 |
| 2,905,657 | 9/1959 | Huffman ................................ 260/77 |
| 2,957,837 | 10/1960 | Smith et al. ............................ 260/77 |
| 3,268,483 | 8/1966 | Klootwijk et al. ................ 260/22 M |
| 3,326,965 | 6/1967 | Schultheis et al. ................... 260/77 |
| 3,379,548 | 4/1968 | Jen ..................................... 260/22 M |
| 3,434,987 | 3/1969 | Dhein et al. .......................... 260/21 |
| 3,549,577 | 12/1970 | Stromberg ......................... 260/850 |
| 3,752,778 | 8/1973 | Dhein et al. .................... 260/22 TN |

FOREIGN PATENT DOCUMENTS

| 1,082,302 | 9/1967 | United Kingdom ............. 260/22 R |
| 1,082,303 | 9/1967 | United Kingdom ............. 260/22 R |
| 131,185 | 1/1949 | Australia ............................... 260/77 |
| 847,407 | 9/1960 | United Kingdom .................. 260/77 |

OTHER PUBLICATIONS

Chemical Abstracts, vol. 76, No. 14, Apr. 3, 1972, p. 73,845h.
Chemical Abstracts, vol. 77, No. 20, Nov. 13, 1972, p. 128,300e.

*Primary Examiner*—Ronald W. Griffin
*Attorney, Agent, or Firm*—Connolly and Hutz

[57] ABSTRACT

A water-insoluble condensation product of a polyalcohol, a dicarboxylic acid, from 5 to 35% by weight of a saturated monohydric alcohol having from 1 to 3 carbon atoms and, optionally, a monocarboxylic acid, said condensation product being soluble in lacquer solvents and useful for producing stoving lacquers.

6 Claims, No Drawings

ENVIRONMENTALLY HARMLESS STOVING LACQUER SYSTEMS BASED ON ALKYD RESINS CONTAINING CONDENSED MONOHYDRIC ALCOHOLS

This application is a continuation-in-part application of our application Ser. No. 659,251, filed Feb. 19, 1976, which in turn is a continuation of our application Ser. No. 460,991, filed Apr. 15, 1974, both now abandoned.

This invention relates to binders for lacquer systems which are harmless to the environment and which can still be worked up as liquids while having a high solids content.

Lacquer systems which contain little or no solvent have been known for a long time. They include, among others, the powder lacquers. These pulverulent lacquer mixtures have an advantage in that they do not emit any harmless solvents when hardened by heat. However, their application entails considerable technical difficulties because they are liable to cake together when subjected to heat and because certain colour tones can be obtained only by melting the powders to form uniform lacquer melts which must then be size-reduced again when cold (G-DR patent specification No. 55,820).

The polyurethane coatings which can be obtained from diisocyanates and liquid polymers which contain hydroxyl groups may be regarded as solvent-free liquid systems. These systems have, however, the disadvantage that mixtures of diisocyanate components with polymers which contain hydroxyl groups are stable only for a limited length of time (German Offenlegungsschrift No. 2,105,062).

On the other hand, stoving lacquers with a high solvent content, based on fatty acid modified alkyd resins to which melamine resins are added have been in wide use in the field of stoving lacquers for many years. There has been no lack of attempts to render these lacquer systems less harmful to the environment and considerable efforts have been made to replace the organic solvents with water. Systems which can be diluted with water have, however, the disadvantage that in addition to the harmful amines required for neutralization they also require substantial quantities of harmful solvents for dilution. In addition, large quantities of energy are required to evaporate the solvents of these systems in the stoving process.

Lastly, the electrophoretic lacquering process should also be mentioned here. This system, however, has the disadvantage that it can only be used for lacquering parts which are conductive.

It has already been attempted to concentrate the technically valuable solvent-containing stoving lacquer systems, and in German Offenlegungsschrift No. 2,019,282 there have been disclosed binder systems which, in the form of clear lacquers, contain about 30% by weight of solvent. These systems, however, have the disadvantage that they are liable to form bubbles and it is therefore recommended to apply the lacquers at temperatures of about 60° C.

A further disadvantage is that no unsaturated fatty acids may be used to achieve these objects and not only is the choice of polyalcohol pairs and dicarboxylic acid pairs restricted, but, in addition these components must be so chosen that they are adapted to each other.

The binders have only a limited compatibility with aminoplasts and often only after a preliminary heat treatment.

It has also been proposed to convert alkyd resins into liquid lacquer raw materials by a precondensation with methylol melamines carried out with heating, in order to obtain a liquid stoving lacquer system which contains little or no solvent. This choice of method has, however, the serious disadvantage that methylol melamines and alkyd resins are incompatible with each other before they are combined. To render them compatible with each other, heat treatment is necessary, but this results in a loss of valuable methylol groups which are required for the crosslinking reaction. The result is that the finished lacquers will only harden at very high temperatures, e.g. 180° C (German Offenlegungsschriften Nos. 2,036,289, 2,036,714 and 2,055,107).

Low-solvent lacquer systems based on oligomeric ricinene alkyd resins have been described in Luxembourg Patent Specification No. 66506. Ricinene alkyd resins, however, generally have the disadvantage that they wrinkle, which, for many purposes, is undesirable.

Luxembourg Patent Specification No. 66506 describes stoving lacquer systems which are harmless to the environment and which are based on mixtures of high molecular weight, polyfunctional hydroxyl compounds and monomolecular, polyfunctional hydroxyl compounds with melamine resin. The examples show that even the clear lacquers obtained in this way are extremely viscous and therefore can only be applied with heating.

It is an object of this invention to provide binders for stoving lacquers which can be applied in the cold, based on alkyd resins which have already been widely used for decades.

This invention relates to stoving lacquer systems based on alkyd resins of polyalcohols and polycarboxylic acids having molecular weights of from 500 to 2000, preferably from 600 to 1300, which alkyd resins contain hydroxyl groups and carboxyl groups and are optionally modified with monocarboxylic acids, and in addition other compounds incorporated by condensation, which other condensed compounds are monohydric alcohols.

The incorporation of monohydric alcohols in alkyd resins is by no means new (Joh. Scheiber, Chemie und Technologie der Kunstlichen Harze, Page 654 et. seq.). Alkyd resins modified in this way have been used in various high solvent lacquer systems but have failed to achieve any position of importance on account of their properties.

It was therefore surprising and not foreseeable that the incorporation of monohydric alcohols would be able to give rise to an extremely highly soluble alkyd resin with a very wide spectrum of compatibility, which could be used as a binder in low-solvent lacquer systems, i.e. systems containing less then 30% by weight of solvent, which systems have excellent lacquer technical properties and can be applied when cold. It has also been found that the excellent lacquer technical properties are not lost if the lacquer systems containing more than 30% by weight of solvent and preferably 30 – 60% by weight are used. Such high solvent lacquer systems may be used, for example, in plants which are equipped with a solvent combustion plant, especially if the stoving ovens are heated by the heat supplied by the combustion plant. Preferably, however, the stoving lacquer systems according to the invention are used solvent-free or with a low solvent content.

The lacquer systems based on the alkyd resins according to the invention can even be applied in thick layers to a vertical surface without dripping, which is in contradiction to the existing teaching that low-molecular weight alkyd resin stoving lacquers tend to drip in the stoving process (Luxembourg Patent Specification No. 66,506). The lacquer coats obtained are brilliant white with a high gloss and an even surface. They are elastic and have a unique hardness substantially in excess of that which would have been expected and give excellent results in the corrosion and weather tests.

The coatings have no tendency to form bubbles, even when applied in thicker layers and may therefore be used, for example, for spraying motorcars without first preparing the surface with fillers. This not only rationalises the spraying operation but also has an important advantage from the point of view of preventing environmental pollution since the high solvent spray filler normally required can now be replaced by the low-solvent binder system.

The acid numbers are within the normal range for alkyd resins used as stoving lacquers. With acid numbers of from 3 to 20, lacquers which are exceptionally stable in storage can be obtained, whereas with acid numbers of from 20 to 40 highly reactive lacquers can be obtained, i.e. lacquers which are crosslinked at a lower temperature. The OH-number should be between 40 and 300 and is prefereably between 60 and 150. It can be determined by suitable choice of the quantity of polyalcohol used in relation to the quantity of dicarboxylic acid, monocarboxylic acid and monohydric alcohol. The molecular weight of the polyester can also be determined by a suitable choice of the components.

The polyalcohols used may be divalent aliphatic or cycloaliphatic alcohols with 2 to 15 carbon atoms such as ethylene glycol, propylene glycols, diethylene glycol, dipropylene glycols, butanediols, isobutenediol, neopentyl glycol, dimethylolpropane, hexanediols, perhydro-bisphenol and dimethyl cyclohexanes, or trihydric alcohols such as glycerol, trimethylol ethane, trimethylol propane or trimethylol hexane. Alcohols with a higher valency may also be used, such as pentaerythritol, dipentaerythritol or sorbitol or mixtures of higher valent alcohols. Partially etherified polyalcohols such as trimethylolpropane monoallyl ether may also be incorporated.

The dicarboxylic acids used may be aromatic, cycloaliphatic or aliphatic dicarboxylic acids or derivatives thereof, for example phthalic acid, isophthalic acid, terephthalic acid, hexahydrophthalic acid, hexahydroisophthalic acid, hexahydroterephthalic acid, tetrahydrophthalic acid, methyl-tetrahydrophthalic acid, endomethylene tetrahydrophthalic acid, endoethylene tetrahydrophthalic acid, adipic acid, succinic acid, glutaric acid, maleic acid, fumaric acid or suberic acid as well as dimeric fatty acid; phthalic acid and adipic acid are preferred.

Suitable monocarboxylic acids, which should be present in an amount of from 0 to 40% by weight, include fatty acids such as 2-ethyl-hexanoic acid-(1), fatty acids obtained in the first runnings of distillation, coconut-oil fatty acid, ricinoleic acid, ricinene-fatty acid, soya-oil fatty acid, conjugated soya oil fatty acid, safflower-fatty acid, linseed-oil fatty acid, wood-oil fatty acid, groundnut oil fatty acid and tall-oil fatty acid; these may be used as fatty acids or in the form of their oils. Preferably from 80 - 100% by weight of the monocarboxylic acid component consists of soya oil fatty acid and from 20 to 0% by weight consists of the other monocarboxylic acids mentioned above because exceptionally smoothly spreading coatings are then obtained. Monocarboxylic acids such as benzoic acid, butyl benzoic acid, hexahydrobenzoic acid, p-tetrabutyl-hexahydrobenzoic acid and acrylic acid as well as other aliphatic cycloaliphatic or aromatic monocarboxylic acids may also be used.

Suitable monohydric alcohols are those which contain 1 to 3 carbon atoms per molecule, such as methanol, ethanol, propanols.

The monoalcohol content may be from 5 to 35% by weight and the sum of monoalcohol content and monocarboxylic acid content should be from 5 to 52% by weight.

Exceptionally good results are obtained if the quantity of monoalcohol is from 5 to 12% by weight when the monocarboxylic acid content is from 22 to 35% by weight or if the quantity of monoalcohol is from 20 to 35% by weight when the monocarboxylic acid content is from 0 to 5% by weight. The hardness and elasticity can be adjusted in conventional manner by a suitable choice of the composition of the dicarboxylic acids, polyalcohols, monocarboxylic acid and monoalcohols. Thus, exceptionally hard coatings are obtained when using phthalic acid, propanediol, trimethylolpropane, benzoic acid and methanol whereas highly elastic coatings are obtained when using adipic acid, hexanediol, trimethylolpropane, 2-ethyl-hexanoic acid-(1) and propanol.

The alkyd resins may be prepared by condensation of the monomers by the usual methods, the polyesters being condensed until the desired acid number is obtained. Alternatively, however, a polycondensate with a lower acid number may first be prepared and this may then be acidified to the required acid number by the addition of a dicarboxylic acid anhydride, which is accompanied by semiester formation.

An azeotropic method of procedure is recommended in order to avoid any loss of monomers in the process of esterification.

Alkyd resins which have no monoalcohols built into them are obtained if a semiester is first prepared from a dicarboxylic acid anhydride and monoalcohol, preferably monomethyl phthalate, and this semiester is then reacted with the remainder of the monomers to form the polycondensate.

In one process which is particularly preferred, an alkyd resin with an acid number of below 5 is first prepared from polyalcohol, dicarboxylic acid and monocarboxylic acid, using a molar ratio of dicarboxylic acid to polyols of 0.4 - 0.9, preferably 0.5 - 0.80, and this alkyd resin is then reacted in a second stage of the process with a semiester of dicarboxylic acid and monoalcohol, preferably monomethyl phthalate, to form a polycondensate still containing free hydroxyl groups. This method is particularly advantageous because it prevents the formation of dicarboxylic acid diethers from dicarboxylic acid and methanol. If desired, the acidity of the reaction product may subsequently be increased by adding dicarboxylic acid anhydride.

The polycondensates may, of course, contain small quantities of unesterified semiesters of monoalcohol and dicarboxylic acid, the quantity of semiester depending on the esterification equilibrium.

Suitable crosslinking components for oven drying two-component lacquers are, for example, aminoplasts such as urea formaldehyde resin, triazine resins such as formoguanamine resin, acetoguanamine resin, benzoguanamine resins or their definite preliminary stages, in which the methylol groups may be partly or completely etherified with monohydric alcohols containing 1 to 4 carbon atoms.

The alkyd resins can be used to produce solvent-free, low-solvent or high-solvent stoving lacquers which can be applied when cold. The solvents, if used, may be conventional lacquer solvents such as hydrocarbons, alcohols, esters or ketones. The usual auxiliary agents such as stabilisers, pigments and fillers, may be used in the high-solvent lacquers. This advantage in the method of application does not, of course, exclude the possibility of applying the lacquers when hot. It is therefore possible to prepare high solid stoving lacquer systems which can be applied when either hot or cold. It is, of course, also possible although not necessarily advisable to add excess quantities of solvent to the lacquer systems and apply them with a low solids content.

Stoving lacquer systems which are completely free from solvent can be prepared by replacing all the solvent with a reactive diluent, for example a polyalcohol, which is capable of crosslinking with the melamine resin in the stoving process. Reactive diluents of this kind are, for example, glycerol, 2-ethyl hexane-1,3-diol and castor oil.

The following examples serve to explain the object of the invention without restricting it. The parts given are parts by weight, the percentages are percentages by weight.

EXAMPLE 1

1340 parts of trimethylolpropane, 888 parts of phthalic acid anhydride and 1112 parts of soya oil fatty acid are esterified to an acid number 3 at 220° C in a nitrogen atmosphere.

This precondensate has a molar ratio of condensed dicarboxylic acid to condensed polyalcohols of 0.6.

3160 parts of the precondensate are reacted with 1116 parts of cyclohexanol-phthalic acid semiester to an acid number of 5 and viscosity corresponding to a time of outflow of 100 seconds (determined according to DIN 53 211 as 80% xylene solution) based on the sum of xylene and the alkyd resin. 4204 parts of the resulting product are then reacted with 296 parts of phthalic acid anhydride under conditions required for semiester formation to produce a polyester having an acid number of 20 and a viscosity corresponding to a time of outflow of 145 seconds (80% in xylene).

The alkyd resin according to the invention contains about 9% of cyclohexanol condensed in it, with a fatty acid content of about 25%, an OH-number of 96 and a molecular weight of 1050.

A low-viscosity, 80% white lacquer can be prepared from 125 parts of the 80% solution, 100 parts of titanium dioxide and 35.7 parts of a 70% solution of a highly reactive melamine resin in butanol (Maprenal experimental product 5527 of Cassella Farbwerke Mainkur A.G., Frankfurt). This lacquer produces high gloss, extremely firmly adhering, nail-hard and elastic lacquer coats.

The very wide compatibility spectrum of the alkyd resins described in the invention is demonstrated by the following clear lacquer test: if the alkyd resin and melamine resin are compatible with each other, clear lacquer coatings can be produced from them. If the binder and melamine resin are incompatible with each other, the coatings are opaque.

The binder/melamine resin ratio used in the clear lacquer test is 4 : 1 and stoving is carried out at 30°- 120° C.

|  | Methanol-etherified melamine resin (Cymal 301 of Cyanamid Comp. representatives Cyanamid GmbH, Munich) | highly reactive melamine resin |
| --- | --- | --- |
| Alkyd resin obtained according to the example of the invention | clear | clear |
| Alkyd resin according to the example in Luxembourg Patent Specification No. 66506 | clear | opaque |

In contrast to the alkyd resin obtained according to the example in the Luxembourg Patent Specification, the alkyd resins according to this invention are compatible with the highly reactive melamine resin.

EXAMPLE 2

1340 parts of trimethylolpropane, 888 parts of phthalic acid anhydride and 1112 parts of soya oil fatty acid are esterified to an acid number 3 at 220° C in a nitrogen atmosphere.

This precondensate has a molar ratio of condensed dicarboxylic acid to condensed polyalcohols of 0.6.

3160 parts of the precondensate are reacted with 1116 parts of cyclohexanol-phthalic acid semiester to an acid number of 5 and a viscosity corresponding to a time of outflow of 100 seconds (80% in xylene, determined according to DIN 53 211). 4204 parts of the resulting product are then reacted with 296 parts of phthalic acid anhydride under conditions required for semiester formation at 220° C to form a polyester with an acid number of 15.5 and a viscosity corresponding to a time of outflow of 95 second (50% in xylene).

The alkyd resin according to the invention contains about 9% of cyclohexanol condensed in it and has a fatty acid content of about 25%, an OH-number of 90 and a molecular weight of 1600.

A 48% white lacquer can be prepared from 200 parts of the 50% solution, 100 parts of titanium dioxide and 35.7 parts of a 70% solution of the highly reactive melamine resin in butanol as described in Example 1.

The very wide compatibility spectrum of the alkyd resins described in the invention is demonstrated by the following clear lacquer test: if the alkyd resin and melamine resin are compatible with each other, clear coatings can be produced. If the binder and melamine resin are incompatible, the coatings obtained are opaque.

The binder/melamine resin ratio used in the clear lacquer test is 4 : 1 and stoving is carried out at 30° to 120° C.

|  | Methanol-etherified melamine resin | highly reactive melamine resin |
| --- | --- | --- |
| Alkyd resin according to the example of the invention | clear | clear |
| Alkyd resin according to the example in Luxembourg Patent Specification No. 66506 | clear | opaque |

In contrast to the alkyd resin obtained according to the example in the Luxembourg Patent Specification, the alkyd resins according to the present invention are compatible with the highly reactive melamine resin.

What we claim is:

1. A water-insoluble product consisting essentially of the condensation product of an aliphatic or cycloaliphatic polyalcohol having 2 to 15 carbon atoms, an aromatic, cycloaliphatic or aliphatic dicarboxylic acid, from 0 to 40% by weight of a monocarboxylic acid and from 5 to 35% by weight of a saturated monohydric alcohol having from 1 to 3 carbon atoms, said condensation product having a molecular weight of between 500 and 2000, an acid number of 3 to 40 and an OH number of 40 to 300 and being soluble in lacquer solvents selected from the group consisting of hydrocarbons, alcohols, esters and ketones.

2. The condensation product of claim 1 wherein said condensation product contains 5 to 12% by weight of said saturated monohydric alcohol and 22 to 35% by weight of a monocarboxylic acid.

3. The condensation product of claim 2 wherein 80 to 100% by weight of said monocarboxylic acid is a soya oil fatty acid.

4. The condensation product of claim 1 wherein said condensation product contains 20 to 35% by weight of a monocarboxylic acid.

5. The condensation product of claim 4 wherein 90 to 100% by weight of said monocarboxylic acid is a soya oil fatty acid.

6. The condensation product of claim 2 wherein said OH number is from 60 to 150.